United States Patent
Hatcher et al.

[11] 3,773,623
[45] Nov. 20, 1973

[54] SLIME CONTROL IN INDUSTRIAL WATERS

[75] Inventors: Herbert J. Hatcher, Bloomington; Robert J. Truda, St. Paul; Thomas G. Lechner, Lake Elmo; Charles R. McDuff, St. Paul, all of Minn.

[73] Assignee: Economics Laboratory, Inc., St. Paul, Minn.

[22] Filed: Feb. 25, 1972

[21] Appl. No.: 229,596

Related U.S. Application Data

[62] Division of Ser. No. 69,933, Sept. 4, 1970.

[52] U.S. Cl. .............. 195/60, 106/15 AF, 162/190, 210/1, 162/161
[51] Int. Cl. ............................................ B32b 27/40
[58] Field of Search ................... 195/31, 62, 64, 65, 195/66, 68, 57, 52, 60; 162/161, 190; 99/96; 106/15 AF

[56] References Cited
UNITED STATES PATENTS
3,654,086    4/1972    Ziffer .................................. 195/63

OTHER PUBLICATIONS

Avigad et al., Meth in Eng Vol. VIII, No. 106 "Fructan Hydrolasis," p.621–628, 1966. QP601C72

*Primary Examiner*—Lionel M. Shapiro
*Attorney*—Merchant & Gould

[57]      ABSTRACT

Slime formation is controlled (e.g., retarded or removed) by the intentional addition to industrial waters (e.g., white water in pulp and paper mills) of slime controlling amounts of the enzyme levan hydrolase.

3 Claims, No Drawings

SLIME CONTROL IN INDUSTRIAL WATERS

CROSS-REFERENCE TO RELATED APPLICATIONS

This is a division of application Ser. No. 69,933, filed Sept. 4, 1970 entitled "SLIME CONTROL IN INDUSTRIAL WATERS"

BACKGROUND OF THE DISCLOSURE

The formation of slime in industrial waters is a major industrial problem.

The term "slime" is a broad one covering a wide range of viscous, mucous, or leathery materials and mixtures found in industrial waters. Slimes are frequently polymeric in nature and can be broadly classified as chemical, biological, or composite slimes depending upon their cause or composition. For example, raw materials and equipment used in the paper industry are not sterile and water used in conjunction with such equipment is continuously being contaminated with a wide variety of microorganisms from such sources as wood pulp, chemicals, air, make-up water, and the like. The existing conditions of temperature and the like permit the growth of a wide range of microorganisms. The growth of certain specific forms of these biological contaminants causes or produces polymeric excretions or products that are or become slime.

Historically, slime formation has been controlled by the addition to industrial waters (e.g., white water associated with the pulp and paper industry) of slimicides. The purpose of these slimicides is to destroy or arrest the growth of some of the many organisms present in the water to thereby prevent or retard the formation of slime. Slimicides (or toxicants as they are sometimes called) fall into two general categories; the first, biocides; and the second, biostats. Chemicals used as slimicides have included chlorine, phenylmercuric acetate, pentachlorophenol, tributyl tin oxide, and isothiocyanates, all of which are relatively toxic to humans.

Many workers have investigated the causes of slime formation in industrial waters and it is generally recognized that a broad spectrum of bacteria, predominately gram-negative bacteria, are responsible for the formation of slimes, particularly paper mill slimes. Yeasts and molds are lesser causes of slime than bacteria, particularly in paper mills. For example, although molds are easily isolated from industrial waters and cultivated in the laboratory, rapid natural fungal growth from mixed cultures in recirculating industrial waters has not been observed.

Those engaged in the search for slimicides or toxicants have periodically observed the lack of correlation between the total bacterial counts and slime accumulation. Frequently, high bacterial total counts have been noted in environments in which no significant slime build-up have been observed. Similarly, low bacterial total counts have been observed in conjunction with substantial accumulations of slime. These observations have been a source of concern to those engaged in the water treatment industry.

SUMMARY OF THE INVENTION

We have observed that levan (a specific type of fructose polymer which is produced by a wide variety of bacteria) is a significant component of many industrial slimes. We have further discovered that it is difficult and economically impractical to attempt to destroy or arrest the growth of all common bacteria that produce levan. We have found that slime accumulation can be controlled more readily by the addition of the enzyme levan hydrolase to the industrial water to thereby hydrolyze the levan produced by the bacteria. Although the enzyme may be used in conjunction with biocides and biostats, effective control over slime formation can be obtained by the mere use of this specific enzyme (i.e., levan hydrolase).

DETAILED DISCUSSION

Industrial Waters and the Slime Problem

Industrial waters comprise those waters used in industrial plants for such purposes as conveying particulate material (e.g., paper pulp), cooling, and the like. Although the present invention is applicable to a wide range of industrial waters in which slime formation characteristically occurs, the present invention is particularly useful in the treatment of white water associated with pulp and paper mills. Consequently, the present invention will be described with particular reference to the treatment of slime formations in paper mill water systems without intending to be limited thereby.

Various persons have reviewed the slime problem in the paper industry caused by microorganisms present in white water. Attention is directed to the following articles and the references cited therein:

Coster, E., The Slime Problem in the Paper Industry Caused by Microorganisms, Appita 21, No. 4: 131–138 (January, 1968).

Leckey, C. R., The Slime Board Method of Paper Mill Toxicant Evaluation, Tappi 43, No. 9: 781–783 (September, 1960).

Michalski, R. J. et al, A Method for Determining The Effect of Dispersants in Slime Control Performance, Tappi 46, No. 2: 167a–172a (February, 1963).

We have observed, as have prior workers, that the degree of slime formation cannot be directly correlated with total microbial counts probably because white water contains a broad spectrum of microorganisms. However, the presence of a broad spectrum of microorganisms in such industrial waters is responsible for the activities of other workers in attempting to identify or produce chemicals having broad biocidical or biostatic properties.

In the course of our work, we found that a common type of polymer produced by many species of bacteria is a polysaccharide known as a levan. A levan is a polymer made up of fructose units joined by beta — 2,6' — linkages. We decided to approach the problem of slime accumulation by a direct attack on the slime, particularly upon levan, as opposed to an attack upon the organisms responsible for producing the slime.

The Enzyme

We have discovered that slime accumulation can be controlled or reduced by the addition to industrial waters containing levan-forming organisms by the addition to such waters of the enzyme levan hydrolase (sometimes called levan polyase).

The enzyme levan hydrolase is produced by a variety of microorganisms. It is possible that some of the enzyme is inherently produced in certain industrial water systems. This may account, in part, for the lack of correlation between total microbial count and slime formation. However, the conditions that exist in industrial waters such as white water do not ordinarily favor the production of substantial amounts of the enzyme. Consequently, it is necessary to isolate and grow an appropriate enzyme-producing microorganism under conditions that favor maximum production of the enzyme. Microorganisms that are reported to produce the enzyme levan hydrolase include the following:

Rhodotorula sp.
Azotobacter sp.
Bacillus sp.
Arthrobacter sp.
Micrococcus sp.
Pseudomonas sp.

The form of the enzyme will vary depending upon the particular source of the enzyme that is cultured. For example, levan hydrolase produced by Azotobacter sp. produces an extra-cellular enzyme whereas the yeast Rhodotorula sp. produces enzyme within or on the cell structure.

Use of Levan Hydrolase to Control Slime Accumulation

Levan hydrolase is used to control slime accumulation by the intentional addition of the enzyme to industrial waters containing slime-forming microorganisms. The concentration of the enzyme can vary widely and will depend upon such factors as the type of industrial water being treated (e.g., white water), the conditions of treatment (e.g., temperature and pH of the water), the source of the enzyme (e.g., Rhodotorula sp.), and the enzyme activity. When using the enzyme in the form of dead cells of the yeast Rhodotorula sp. (at an activity of 20 units per gram), concentrations of from about 1 ppm up to 100 ppm of the cells in water are effective. Above 500 ppm, there is sometimes a tendency for the enzyme to discolor the water being treated. Good results are generally obtained at concentrations of 0.5-20 ppm (e.g., 1-10 ppm). Such cells are conveniently used by drying the cells, diluting them with a salt (e.g., a metal sulfate such as sodium sulfate) to a concentration of, for example, ten percent by weight, and thereafter adding the resulting mixture to the water to be treated. If desired, the enzyme can be added to the water alone or mixed with other water additives (e.g., biocides, biostats, buffers, and the like).

The present invention is further illustrated by the following specific examples. Unless otherwise indicated, all parts and percentages are by weight.

Experimental Preparation of the Enzyme Levan Hydrolase a. Maintenance of Rhodotorula sp.

A species of the yeast *Rhodotorula* was isolated using enrichment culture techniques. This microorganism was found to be capable of decomposing levan and was thereafter maintained in soil tubes and on an agar slant medium having the following composition in grams per liter.

Beef Extract (Difco) — 10.0
Yeast Extract (Difco) — 3.0
Peptone (Difco) — 10.0
Sucrose — 50.0
Sodium Chloride — 5.0

In making the slant medium, sufficient distilled water was added to dissolve the above listed ingredients. The resulting solution was adjusted to pH 7.5 with 2.5 M sodium hydroxide and 1.2%/W/V agar (Difco) was added. The suspension was then made up to volume with distilled water. The agar was melted by heating the medium and boiling as short a time as necessary. The medium was dispensed in test tubes and sterilized at 121° C for 20 minutes. The tubes were cooled in a slanted position to obtain a long slant and short butt.

The slant medium was inoculated from soil tubes and the cultures of *Rhodotorula sp.* were incubated at 30° C. for from four to five days before use.

b. Preparation and Inoculation of Seed Medium

Two ml of a 5 ml sterile water suspension of a 4- to 5-day-old *Rhodotorula* culture was used to inoculate 50 ml of seed medium in a 250 ml baffled Erlenmeyer flask. The seed medium contained the following ingredients in grams per liter of aqueous medium:

Sucrose — 20.0
Black Strap Molasses — 15.0
Yeast Extract (Difco) — 5.0
Peptone (Difco) — 12.0

The pH of the medium was adjusted to 6.7.

The medium was sterilized by autoclaving at 121° C. for 20 minutes and then cooled as rapidly as possible. After inoculation, the cultures were incubated on a incubator-shaker (New Brunswick Gyrotory Model G-25) operating at about 150 rpm and 27° C. for 24–26 hours.

c. Preparation and Inoculation of Inoculum Medium

The contents of one 24–26 hour 50 ml culture of seed growth was used to inoculate 500 ml of inoculum medium in a two-liter baffled Erlenmeyer flask. The inoculum medium contained the following ingredients in grams per liter of aqueous medium:

Black Strap Molasses — 100.0
Epsom Salts — 0.6
Yeast — 2.5
Corn Steep Liquor — 20.0
Diammonium phosphate — 10.0

The solution was adjusted to pH 6.7, sterilized by autoclaving at 121° C. and cooled as rapidly as possible. After inoculation, cultures were incubated for 22–24 hours as described for the seed medium.

d. Preparation and Inoculation of Production Medium

The contents of two 22–24 hour 500 ml cultures of inoculum growth was used to inoculate 8kg. of production medium in a 14 liter fermentor. The fermentor was fully baffled and agitation was provided by means of two fixed vane, turbine-type, impellers 10 cm apart and 10 cm in diameter. Sterile air was introduced through a one-fourth inch I.D. open pipe located directly beneath the bottom impeller. The fermentor was operated at an agitator speed of 700 rpm with air flow at one volume per volume of medium per minute. The temperature was controlled at 27° C.± 2° C. by means of a circulating water bath. Foam control was accomplished by the use of anitfoam agents.

During the production phase, growth was monitored by measurement of pH and packed cell volumes. The latter were measured in calibrated conical centrifuge tubes. Levan hydrolase activity was measured by a modification of the tetrazolium chloride assay described by Avigad, et al.[1]. Levan substrate for the enzyme assay was prepared using *Aerobacter levanicum* according to the method of Avigad[2], but isolation of the levan was omitted. The form of levan obtained in the isolation procedure is not decomposed appreciably by the enzyme produced by our strain of *Rhodotorula*. The enzyme assay procedure was as follows:

*Rhodotorula* cells were separated from fermentor broth by centrifugation or by ethanol precipitation. The cells were diluted in 0.05 M morpholinopropane sulfonic acid buffer (pH 6.5). One ml of diluted enzyme was added to each of three test tubes. The tubes were placed in a 40° C. water bath for 5 minutes. One ml of substrate containing at least 10 micromoles of levan (determined as fructose) was added to the first two tubes, the third being used as a reagent blank. After exactly 30 minutes reaction time, 2.0 ml of 0.5 M sodium hydroxide were added to all three tubes. One ml of substrate was added to the reagent blank. Then 2.0 ml of 10 percent zinc sulfate heptahydrate were added to all tubes. The precipitate was removed by either filtration or centrifugation, and 1.0 ml of the supernate was added to each of three test tubes. After adding 1.0 ml of 1

1. Avigad, L., Ruth Zelikson, and S. Hestrin, *Selective Determination of Sugars Manifesting Enediol Isomerism by Means of Reaction with Tetrazolium.* Biochem. J. 80, 57–61 (1961). 2. Avigad, L., *Methods in Carbohydrate Chemistry* V, 161–165. Academic Press, New York (1965).

percent 2,3,5-triphenyl-2H-tetrazolium chloride, the tubes were placed in a 40° C. water bath for five minutes. Then 1.0 ml of 0.5 M NaOH was added to each tube. After exactly 15 minutes, 5 ml of a 10 percent by volume glacial acetic acid in methanol solution was added to stop the reaction. The optical density was read at 580 m$\mu$ in a spectrophotometer.

Tubes which contain a red precipitate in the above assay must be discarded and the cells diluted further for reassay. Units of activity per unit weight is defined as the product of dilution factor and optical density at 580 millimicrons.

When assays indicated that the yield of levan hydrolase reached a maximum, the fermentation was terminated and the cells of Rhodotorula were collected.

e. The Recovery of Levan Hydrolase

A total weight of 45,300 grams of broth was collected from six production fermentors 44 hours after inoculation. The broth was passed through a separator which separated the broth into a wort phase and a yeast concentrate. The wort phase was diluted to the original volume of broth and again passed through the centrifuge. The yeast concentrates from the first and second centrifugations were combined. The second wort, which had a very low yeast packed cell volume, was discarded. The total yeast concentrate was diluted to 2.5 times its volume with water containing one percent of a non-ionic surfactant (commercially available as DC-161 from Economics Laboratory, Inc. of St. Paul, Minnesota). It has been found that the activity and appearance of the final product is improved by the surfactant wash. The suspension was again passed through the separator and the wort discarded. The yeast concentrate was diluted with denatured alcohol (95 percent ethanol) until the alcohol concentration of the mixture reached 70 percent. A precipitate formed and was thereafter collected by filtration. The filtrate was discarded and the cake dried in a vacuum oven at 40° C. The cake was then ground to a fine powder (80 mesh). A total weight of 736 grams of yeast was collected having a levan hydrolase activity of 20 units per gram.

Experimental Procedures for Examples 1–5

The apparatus used in these examples was similar to that described by Leckey.[3] In this experimental system, paper mill white water (synthetic or natural) is passed over wood boards in such a manner as to encourage the build-up of a mass of wood pulp, insoluble inorganic materials and microbial cells. The mass is held together by bacterial slime so that it is similar in nature to the substance found to be a problem in paper mills.

Two boxes were used in these examples, one for testing the enzyme and one for control purposes. Each box was built to accommodate five gallons of white paper and five slime boards positioned just above the surface of the water at an angle of inclination of about 45°. The white water was run over the boards from a horizontal manifold attached to a submersible pump. Five holes in the manifold were located about 2 inches above the five boards. The flow rate of the water from the manifold varied considerably depending upon slime accumulation, but averaged roughly 500 ml per minute. In examples 1–3, white water was obtained from a paper mill on a daily basis. The initial sample consisted of ten gallons to fill both boxes. Thereafter, one gallon of fresh white water was added after 3. Leckey, C. R., *The Slime Board Method of Paper Mill Toxicant Evaluation*, TAPPI, 43, 781–783 (1960).

1 gallon had been removed. The latter was used for determination of microbial plate count, pH, and qualitative analysis for fructose. The temperatures of the boxes were allowed to reach their own levels to simulate the variable conditions found in paper mills. Average temperature values are given in the results. On some days, temperatures varied over as much as a ten degree range.

In order to allow for differences in box geometry and pumps, the box receiving the enzyme was alternated with each experiment. Enzyme was added according to apparent need.

Plate counts were made using the following medium at a pH of 6.7-7.0:

| | |
|---|---|
| Plate Count Agar (Difco) | 2.4 grams |
| Brom Cresol Purple (alcoholic solution 1.6%) | 0.1 ml |
| $CaCl_2 \cdot H_2O$ (0.026% solution) | 1.0 ml |
| $Mg SO_4 \cdot 7H_2O$ (0.05% solution) | 1.0 ml |
| Distilled water to 100 ml | |

The medium was sterilized at 121° C. for 30 minutes.

All plates were incubated, after inoculation, at 45° C. for two days. Colonies were counted by means of a New Brunswick Colony Counter, Model C-110.

Qualitative tests for fructose were made using the resorcinol-thiourea reagent method described by Avigad[2]. In this test, both fructose as levan and free fructose are detected if present. Samples were also examined for the presence of free fructose, alone, using 2,3,5-triphenyl-2H-tetrazolium chloride reagent (TTC). The latter reagent can also be used for detection of glucose, but the reaction can be made more specific for ketose sugars by the use of a short reaction time.

2. Avigad, L., *Methods in Carbohydrate Chemistry* V, 161–165. Academic Press, New York (1965). A positive resorcinol test (levan plus free fructose) and a negative TTC test (free fructose, only), means that only levan is present.

In Examples 4 and 5, synthetic white water was sterilized and then inoculated with a known levan-producing bacterium, *Aerobacter levanicum* (ATCC No. 15552) to study the effect of *Rhodotorula* levan hydrolase cell concentration on bacterial slime in a simulated paper mill system. Much more rapid experimental results can be obtained in this system than with natural paper mill white water. The synthetic white water contained the following ingredients in grams per liter:

| | |
|---|---|
| Powdered cellulose | 2.0 |
| Bactopeptone | 10.0 |
| Sucrose | 50.0 |
| Starch | 0.3 |
| China Clay | 0.3 |
| Titanium dioxide | 0.2 |
| Animal glue | 0.01 |
| Wet strength resin | 0.3 |
| Sodium aluminate | 0.2 |
| Rosin size | 0.2 |

The pH of the synthetic white water was adjusted to pH 5.0 with technical grade sulfuric acid.

In Examples 4 and 5, each white water box was cleaned with 70 percent ethanol before addition of 20 liters of the sterile synthetic white water. The white water was then inoculated with 2 liters of *A. levanicum* culture. The bacteria for the inoculum were grown in one liter baffled flasks containing 300 ml of synthetic white water at 27° C. for 18 hours. All other aspects of Examples 4 and 5 were carried out as described for experiments with paper mill white water.

Thin layer chromatography on cellulose was used to establish that the fructan observed in paper mill white water was identical, at least in part, to that formed by *Aerobacter levanicum*, and that it was decomposed in the same manner as the bacterial levan.

The results of Examples 1–5 are set forth in the tables which follow.

Example 1

This example was run on White Water from a Fourdrinier Paper Machine of Paper Mill A.

Untreated White Water

| Days of Run | Temp. °C. | pH | Colonies per ml | Resorcinol-Thiourea | TTC |
|---|---|---|---|---|---|
| 3 | 50 | 7.9 | $2.3 \times 10^8$ | – | – |
| 4 | 42 | 8.4 | $6.6 \times 10^7$ | – | – |
| 5 | 46 | 8.5 | $7.9 \times 10^7$ | – | – |
| 6 | 41 | 8.4 | $1.9 \times 10^8$ | – | – |
| 7 | 44 | 8.3 | $8.9 \times 10^8$ | – | – |
| 10 | 49 | 8.4 | $1.2 \times 10^9$ | – | – |
| 11 | 49 | 8.5 | $9.6 \times 10^7$ | – | – |
| 12 | 49 | 8.5 | $7.9 \times 10^8$ | + | – |
| 14 | 49 | 8.3 | $1.2 \times 10^9$ | + | – |
| 17 | 49 | 8.6 | $9.3 \times 10^8$ | + | – |

Enzyme Treated White Water

| Days of Run | Temp. °C. | pH | Colonies per ml | Resorcinol-Thiourea | TTC |
|---|---|---|---|---|---|
| 3 | 45 | 7.4 | $2.2 \times 10^8$ | – | not done |
| 4* | 36 | 8.4 | $7.0 \times 10^7$ | – | Do. |
| 5* | 42 | 8.1 | $3.9 \times 10^8$ | – | Do. |
| 6* | 42 | 7.9 | $4.4 \times 10^8$ | – | Do. |
| 7 | 34 | 7.6 | $9.3 \times 10^7$ | – | Do. |
| 10 | 48 | 7.6 | $9.8 \times 10^6$ | – | Do. |
| 11 | 48 | 7.6 | $5.4 \times 10^6$ | – | Do. |
| 12 | 44 | 7.8 | $5.5 \times 10^7$ | – | Do. |
| 14* | 48 | 7.8 | $1.2 \times 10^8$ | – | Do. |
| 17 | 49 | 7.0 | $4.3 \times 10^6$ | – | Do. |

* 2250 ppm enzyme added with levan hydrolase activity of 2 units/gram. Enzyme additions varied according to apparent effect with trend to reduced amounts. In all cases indicated amount represents average of total addition.

Example 2

This Example was run on White Water from a Cylinder Paper Machine of Paper Mill A.

Untreated White Water

| Days of Run | Temp. °C. | pH | Colonies per ml | Resorcinol-Thiourea | TTC |
|---|---|---|---|---|---|
| 1 | 47 | 4.3 | $3.3 \times 10^5$ | – | – |
| 3 | 46 | 6.2 | $3.3 \times 10^5$ | – | – |
| 4 | 48 | 6.9 | $7.9 \times 10^5$ | – | – |
| 7 | 44 | 4.6 | $4.0 \times 10^6$ | – | – |
| 8 | 46 | 5.6 | $2.3 \times 10^7$ | – | – |
| 9 | 48 | 4.5 | $3.8 \times 10^7$ | ± | ± |
| 11 | 50 | 4.3 | $4.7 \times 10^7$ | + | – |
| 16 | 49 | 4.3 | $6.5 \times 10^7$ | + | – |

Enzyme Treated White Water

| Days of Run | Temp. °C. | pH | Colonies per ml | Resorcinol-Thiourea | TTC |
|---|---|---|---|---|---|
| 1 | 42 | 4.3 | No count | No tests | – |
| 3 | 46 | 5.8 | $3.7 \times 10^5$ | – | – |
| 4 | 44 | 6.9 | $3.6 \times 10^6$ | – | – |
| 7 | 45 | 4.8 | $2.8 \times 10^6$ | – | – |
| 8 | 46 | 5.3 | $3.5 \times 10^7$ | – | – |
| 9* | 49 | 4.8 | $3.8 \times 10^7$ | + | + |
| 10* | No samples taken | | | | |
| 11* | 50 | 7.5 | $5.9 \times 10^7$ | + | + |
| 13* | No samples taken | | | | |
| 16 | 49 | 7.8 | $4.1 \times 10^6$ | + | + |

* 2250 ppm enzyme added with levan hydrolase activity of 2 units/gram.

Example 3

This Example was run on White Water from a Fourdrinier Paper Machine of Paper Mill B.

Untreated White Water

| Days of Run | Temp. °C. | pH | Colonies per ml | Resorcinol-Thiourea | TTC |
|---|---|---|---|---|---|
| 1 | 28 | 7.8 | $1.3 \times 10^6$ | – | – |
| 2 | 44 | 8.6 | $4.9 \times 10^8$ | – | – |
| 6 | 50 | 8.4 | $3.8 \times 10^{10}$ | – | – |
| 7 | 46 | 8.4 | $2.0 \times 10^8$ | + | – |
| 8 | 44 | 8.5 | $4.1 \times 10^8$ | + | – |
| 9 | 49 | 8.5 | $2.1 \times 10^8$ | + | – |
| 10 | 46 | 8.5 | $3.9 \times 10^8$ | + | – |
| 13 | 41 | 8.3 | $1.8 \times 10^{10}$ | + | – |
| 14 | 43 | 8.3 | $2.4 \times 10^8$ | 30 | – |
| 15 | 42 | 8.2 | $2.6 \times 10^8$ | + | – |

Enzyme Treated White Water

| Days of Run | Temp. °C. | pH | Colonies per ml | Resorcinol-Thiourea | TTC |
|---|---|---|---|---|---|
| 1* | 24 | 7.8 | $1.4 \times 10^6$ | – | – |
| 2* | 42 | 7.9 | $5.7 \times 10^8$ | – | + |
| 6 | 45 | 8.3 | $4.0 \times 10^{10}$ | – | + |
| 7 | 46 | 8.1 | $3.8 \times 10^8$ | + | + |
| 8* | 44 | 8.2 | $1.4 \times 10^{10}$ | + | + |
| 9* | 46 | 8.3 | $3.2 \times 10^8$ | + | + |
| 10* | 41 | 8.0 | $3.1 \times 10^{10}$ | + | + |
| 13* | 36 | 8.7 | $2.8 \times 10^{10}$ | + | + |
| 14 | 39 | 8.5 | $2.3 \times 10^8$ | + | + |
| 15 | 39 | 8.4 | $2.9 \times 10^8$ | + | + |

* 300 ppm enzyme added with levan hydrolase activity of 2 units/gram

Example 4

This Example was run on Synthetic White Water Inoculated with Aerobacter levanicum (ATCC 15552).

Untreated White Water

| Days of Run | Temp. °C. | pH | Colonies per ml | Resorcinol-Thiourea | TTC |
|---|---|---|---|---|---|
| 3 | 45 | 5.8 | $2.8 \times 10^8$ | + | – |
| 4 | 42 | 6.9 | $2.2 \times 10^8$ | + | – |
| 5 | 42 | 7.3 | $2.0 \times 10^9$ | + | – |
| 6 | 43 | 7.2 | $2.8 \times 10^{10}$ | + | – |
| 7 | 41 | 7.6 | $2.8 \times 10^9$ | + | – |
| 10 | – | 7.8 | $2.8 \times 10^{10}$ | + | – |
| 11 | 45 | 7.5 | $3.1 \times 10^{10}$ | + | – |
| 12 | 47 | 7.6 | $3.0 \times 10^{10}$ | + | – |

Enzyme Treated White Water

| Days of Run | Temp. °C. | pH | Colonies per ml | Resorcinol-Thiourea | TTC |
|---|---|---|---|---|---|
| 3* | 45 | 6.3 | $2.3 \times 10^8$ | + | – |
| 4 | 44 | 7.1 | $2.9 \times 10^8$ | + | – |
| 5* | 42 | 7.5 | $2.9 \times 10^8$ | + | + |
| 6 | 44 | 7.4 | $3.7 \times 10^9$ | + | + |
| 7 | 40 | 7.8 | $2.0 \times 10^{10}$ | + | + |
| 10* | – | 7.7 | $2.7 \times 10^8$ | + | + |
| 11 | 37 | 7.9 | $3.0 \times 10^9$ | + | + |
| 12* | 46 | 7.3 | $2.8 \times 10^8$ | + | + |

* 15 ppm enzyme added with levan hydrolase activity of 2 units/gram

Example 5

This Example was run on Synthetic White Water Inoculated with Aerobacter levanicum (ATCC 15552).

Untreated White Water

| Days of Run | Temp. °C. | pH | Colonies per ml | Resorcinol-Thiourea | TTC |
|---|---|---|---|---|---|
| 3 | 41 | 6.3 | $2.3 \times 10^8$ | + | − |
| 4 | 42 | 7.1 | $2.3 \times 10^8$ | + | − |
| 5 | 44 | 7.8 | $3.3 \times 10^8$ | + | − |
| 6 | 44 | 8.4 | $2.8 \times 10^9$ | + | − |
| 7 | 48 | 8.2 | $2.0 \times 10^{10}$ | + | − |
| 8 | 48 | Not done | | | |
| 9 | 46 | Not done | | | |
| 10 | 45 | 7.9 | $2.2 \times 10^{10}$ | + | − |

Enzyme Treated White Water

| Days of Run | Temp. °C. | pH | Colonies per ml | Resorcinol-Thiourea | TTC |
|---|---|---|---|---|---|
| 3* | 41 | 5.9 | $2.8 \times 10^8$ | + | + |
| 4* | 42 | 6.8 | $2.1 \times 10^8$ | + | + |
| 5 | 44 | 7.4 | $2.2 \times 10^9$ | + | + |
| 6 | 42 | 7.9 | $2.8 \times 10^9$ | + | + |
| 7* | 44 | 8.0 | $2.7 \times 10^{10}$ | + | + |
| 8* | 44 | Not done | | | |
| 9* | 44 | Not done | | | |
| 10 | 48 | 8.0 | $2.4 \times 10^9$ | + | + |

* 5 ppm enzyme added with levan hydrolase activity of 20 units/gram.

The beneficial results which are obtained can be understood by reference to tests run on white water of Paper Mill B (e.g., see Example 3). Slime removal from the boards and prevention of slime build-up was observed in the enzyme treated system as contrasted to the untreated system. In addition, a small difference in temperature between treated and untreated water was noticed with the lower temperature being obtained in the treated water. Considerable foam formation consistenly occurred in untreated water but was absent in the enzyme treated water. Similar results were obtained with the white water of Paper Mill A.

What is claimed is:

1. A composition for treating slime in industrial waters with the enzyme levan hydrolase, said composition consisting essentially of:
   a. dried, dead cells of the yeast *Rhodotorula* sp., said cells having levan hydrolase activity when mixed with unisolated levan and tested according to the tetrazolium chloride assay;
   b. sodium sulfate, admixed with said dried, dead cells as a diluent therefor.

2. A composition according to claim 1 wherein said composition further contains an additive selected from the group consisting of a biocide, a biostat and a buffer.

3. A composition according to claim 1 wherein said dried dead cells comprise 10 percent by weight of said composition, the balance to 100 percent consisting of sodium sulfate.

* * * * *

UNITED STATES PATENT OFFICE
CERTIFICATE OF CORRECTION

Patent No. 3,773,623　　　　　　　　Dated November 20, 1973

Inventor(s) Herbert J. Hatcher et al

It is certified that error appears in the above-identified patent and that said Letters Patent are hereby corrected as shown below:

In column 4, line 62, "1/" should appear as a superscript 1 (--$^1$--).

In column 4, line 64, "2/" should appear as a superscript 2 (--$^2$--).

In column 5, line 68, "3/" should appear as a superscript 3 (--$^3$--).

In column 6, line 9, "paper" should read --water--.

In column 5, lines 18 - 23; column 6, lines 22 - 24; and column 6, lines 58 - 60, through "...(1965).", the text of footnotes "1", "2", and "3", should have been placed at the bottom of columns 5 and 6 in the order of their appearance in the text of these columns.

In column 6, line 51, "2/" should appear as a superscript 2 (--$^2$--).

In the table headed "Untreated White Water" in "Example 2", column 7, line 62 et seq., the headings for the various columns of the table should not bridge columns 7 and 8. Thus, the heading for the first column of the table should read --Days of Run--, for the second column --Temp. °C.--,　　for the fourth column,--Colonies per ml-- and for the fifth column, --Resorcinol-Thiourea--.

In column 8, line 33, "30" should be a plus sign (--+--).

Signed and sealed this 14th day of May 1974.

(SEAL)
Attest:

EDWARD M. FLETCHER, JR.　　　　　　C. MARSHALL DANN
Attesting Officer　　　　　　　　　Commissioner of Patents